United States Patent [19]

Sander et al.

[11] Patent Number: 4,495,684
[45] Date of Patent: Jan. 29, 1985

[54] PROCESS OF JOINING A CERAMIC INSERT WHICH IS ADAPTED TO BE EMBEDDED IN A LIGHT METAL CASTING FOR USE IN INTERNAL COMBUSTION ENGINES

[75] Inventors: Wilfried Sander; Siegfried Mielke, both of Neckarsulm, Fed. Rep. of Germany

[73] Assignee: Karl Schmidt GmbH, Neckarsulm, Fed. Rep. of Germany

[21] Appl. No.: 424,776

[22] Filed: Sep. 27, 1982

[30] Foreign Application Priority Data

Aug. 14, 1982 [DE] Fed. Rep. of Germany ....... 3230388

[51] Int. Cl.³ .............................. B23P 15/10
[52] U.S. Cl. ................................ 29/156.5 R; 29/447; 29/DIG. 35; 92/213; 92/222; 123/193 P; 123/669
[58] Field of Search .......... 29/156.5 R, 447, DIG. 35; 123/193 P, 668, 669; 92/213, 222, 212

[56] References Cited

U.S. PATENT DOCUMENTS

| | | | |
|---|---|---|---|
| 1,057,159 | 3/1913 | Madsen | 29/447 X |
| 1,462,655 | 7/1923 | Philip | 92/212 |
| 1,490,849 | 4/1924 | Philip | 29/156.5 R |
| 1,790,664 | 2/1931 | Horton | 29/156.5 R |
| 2,063,325 | 12/1936 | McLeod | 92/222 X |
| 2,880,044 | 3/1959 | Coffey | 92/213 |
| 3,075,817 | 1/1963 | Mayes | 123/193 P X |
| 3,402,644 | 9/1968 | Geiger et al. | 92/213 X |
| 4,169,309 | 10/1979 | Meginnis | 29/DIG. 35 X |
| 4,206,537 | 6/1980 | Meginnis | 29/DIG. 35 |

FOREIGN PATENT DOCUMENTS

| | | | |
|---|---|---|---|
| 2919638 | 11/1980 | Fed. Rep. of Germany | 92/222 |
| 570238 | 4/1924 | France | 123/668 |
| 578316 | 9/1924 | France | 123/669 |
| 2444 | 1/1982 | Japan | 123/193 P |
| 2445 | 1/1982 | Japan | 123/193 P |
| 1439328 | 6/1976 | United Kingdom | 92/222 |
| 2092709 | 8/1982 | United Kingdom | 123/193 P |

Primary Examiner—Charlie T. Moon
Assistant Examiner—Ronald S. Wallace
Attorney, Agent, or Firm—Sprung, Horn, Kramer & Woods

[57] ABSTRACT

Ceramic inserts are embedded in thermally highly loaded zones and/or as a heat insulation in light metal castings for use in internal combustion engines.

To provide a firm joint between the insert and the light metal, a metallic material which resists creep and/or relaxation is shrunk on the insert before it is embedded.

6 Claims, 4 Drawing Figures

PROCESS OF JOINING A CERAMIC INSERT WHICH IS ADAPTED TO BE EMBEDDED IN A LIGHT METAL CASTING FOR USE IN INTERNAL COMBUSTION ENGINES

This invention relates to a process of joining an insert which consists of a ceramic material having a low thermal conductivity, a low coefficient of expansion and a low modulus of elasticity and which is adapted to be embedded in a light metal casting for use in internal combustion engines in thermally highly stressed regions of said casting and/or for its heat insulation, which casting consists preferably of an aluminum alloy of the Type AlSi12CuNiMg, particularly in a piston for such engines.

In the design of internal combustion engines, the increasing requirements for a higher power per cylinder and for higher exhaust gas temperatures and for a limitation or reduction of the rate at which heat is to be dissipated by the cooling system of the engine, have resulted in secondary measures for improving the utilization of fuel energy, e.g., in the provision of exhaust-driven superchargers. These measures result in a high thermal loading of the components and require that said components be heat-insulated.

More recently, it has been endeavored, inter alia, to avoid or at least reduce such stresses in that light metal components of internal combustion engines are provided in the correspondingly stressed zones with protective elements consisting of ceramics. For instance, J. H. Stang has proposed in "Designing Adiabatic Engine Components, DEA No. 780 069" to provide a light metal piston with a screwed-on ceramic head, which is insulated from the base by steel discs. Temperatures up to 900° C. can be attained at the head of such light metal piston. But the manufacture of a ceramic protective element which has the required strength is expensive and the clearance volume above the first ring groove of such pistons is relatively large.

Another known light metal piston is formed in its head with a combustion chamber recess and for the protection against heat loads comprises a ring which has an adequate compressive strength and consists of aluminum titanate ($Al_2TiO_5$) and is embedded in the piston head of the rim edge of the combustion chamber recess. That ring has a very high resistance to thermal fatigue and to thermal shock and consists of a ceramic material which has a low thermal conductivity ($\lambda = 2$ W/mK), a low coefficient of expansion ($\alpha = 1.5 \times 12/^{-6}$/K) and a low modulus of elasticity ($E = 2 \times 10^4$ N/mm$^2$). As the light metal solidifies after the casting operation, the resulting contraction results in a contraction joint between the ceramic ring and the surrounding light metal. The resulting compressive stresses ensure that the ring will be held in position and subjected to compressive stresses.

During the operation of the engine, the light metal piston is subjected to deformations resulting in tensile and compressive stresses in the piston head. The resulting tensile stresses in the ring are superposed on the compressive stresses which are due to the contraction joint. As long as the compressive stresses in the ring exceed the tensile stresses, there will be no net tensile stresses or only low net tensile stresses in the ring. That behavior is essential for the life of the ring because ceramic materials will generally resist much higher compressive stresses than tensile stresses without failure. For instance aluminium titanate will resist tensile stresses only up to 40 N/mm$^2$ but will not fail under compressive stresses which are ten times higher. For this reason the ring will not fail or become loose as long as the compressive stresses are sufficiently high in relation to the tensile stresses. This requirement will not be reliably met after a prolonged time of operation of the piston because at the temperatures above 250° C. which occur in the light metal piston the compressive stresses which are due to the contraction joint will be relieved after a relative short time of operation creep and/or relaxation to that the ring will become loose or fail and the light metal piston will no longer operate satisfactorily, with consequential damages. For instance, it has been found in a cast light metal piston consisting of an aluminum alloy of Type AlSi12CuNiMg and having an aluminum titanate ring embedded at the rim of the combustion chamber recess that the initial compressive stress of about 60 N/mm$^2$ which was due to the contraction joint had decreased to 20 N/mm$^2$ after 100 hours as a result of constant expansion at a temperature of 250° C. The high tensile stresses which occur in the ring owing to the creep and/or relaxation in the aluminium alloy result in a formation of cracks in the ring so that the latter becomes loose and the piston can no longer operate satisfactorily. For this reason it has not been usual so far to provide light metal castings for use in internal combustion engines with ceramic inserts embedded in thermally highly stressed regions or for heat insulation.

It is an object of the present invention to provide a firm joint between light metal castings of internal combustion engines and ceramic inserts which are adapted to be embedded in said light metal castings.

This object is accomplished in that a metallic material which resists creep and/or relaxation at temperatures up to at least 300° C. is shrunk on the ceramic insert before the latter is embedded in the light metal casting.

The shrunk-on material may particularly consists of a ferrous material and preferably of austenitic cast iron having a lamellar graphite structure, which ferrous material has a high resistance to creep and/or relaxation at temperatures up to about 350° C. The ferrous materials which resist creep and relaxation under the operating conditions ensure that the ceramic insert will be held by a firm contraction joint and will be subjected to high compresive stresses during a long time of operation. It is desirable to provide the insert with a shrunk-on annular outer part consisting of a ferrous material.

The ceramic material of the insert may particularly consist of aluminium titanate although ceramic oxides, carbides, nitrides, borides and silicides may also be used which have a thermal conductivity below 10 W/mK, a coefficient of expansion below $10 \times 10^{-6}$/mK and a modulus of elasticity below $7 \times 10^4$ N/mm$^2$.

The composite component which is thus obtained and consists of a ferrous component and a ceramic component is placed in the casting mold used to make the light metal casting for use in internal combustion engines and is embedded in said castings in known manner in that is is either anchored in the light metal and/or is joined to it by an intermetallic intermediate layer. In the latter case, the composite component is heated in molten light metal to 700° to 750° C. so that a coating of $Fe_2Al_5$ and an overlying coating of pure aluminum are formed on the insert before the latter is embedded in the light metal by a casting operation.

The invention is illustrated by way of example in the drawing and will be explained more fully hereinafter.

Figure 1:
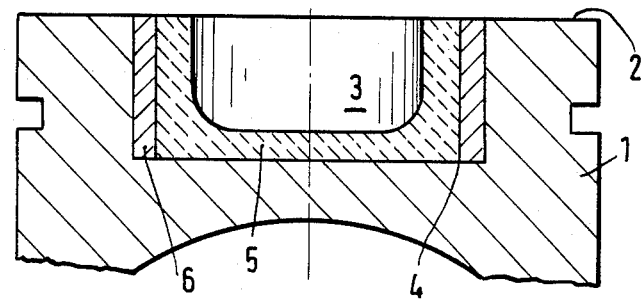
FIG. 1 illustrates a piston with an insert mounted in the head of the piston.

FIG. 1 shows a piston 1, which consists of a light metal casting and is formed in its piston head 2 with a combustion chamber recess 3, in which a composite component 4 is embedded in the piston-head. The composite component 4 consists of a pot-shaped inner part 5 of ceramics and an annular outer part 6, which consists of steel and has been shrunk on the outside peripheral surface of the inner part 5.

Figure 2:
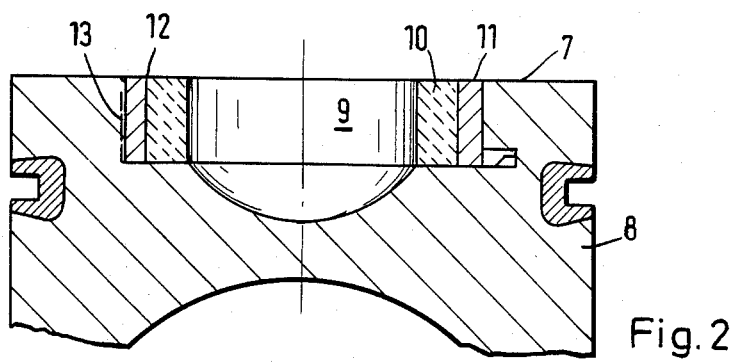
FIG. 2 illustrates a modified form of a piston with an insert mounted in the head of the piston.

In accordance with FIG. 2, the piston head 7 of a piston 8 consisting of a light metal casting is formed with a combustion chamber recess 9, in which a composite component is embedded in the piston head 7. The composite component 12 consists of a hollow-cylindrical inner part 10 of ceramics and an outer part 11, which as been shrunk on the outside peripheral surface of the inner part 10 and consists of special austenitic cast iron and is joined to the light metal by an intermetallic bonding layer 13.

Figure 3:
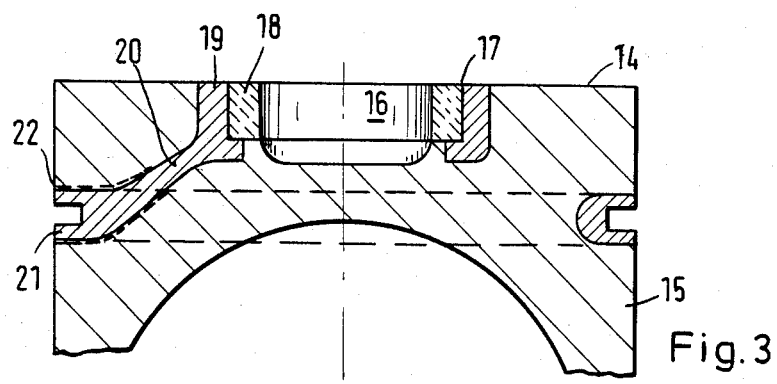
FIG. 3 illustrates a second modified form of a piston with an insert mounted in the head of the piston.

In accordance with FIG. 3 the composite component 17 is embedded in the piston head 14 of the light metal piston 15 in the combustion chamber recess 16 formed in said piston head. The composite component 17 consists of a hollow cylindrical inner part 18 of ceramics and of an outer part 19, which has been shrunk on the outside peripheral surface of the inner part 18 and consists of special austenitic cast iron. The outer part 19 is connected by arms 20 to a ring carrier 21, which consists of the same material and is joined to the light metal adjacent to the arms 20 by an intermetallic bonding layer 22.

Figure 4:
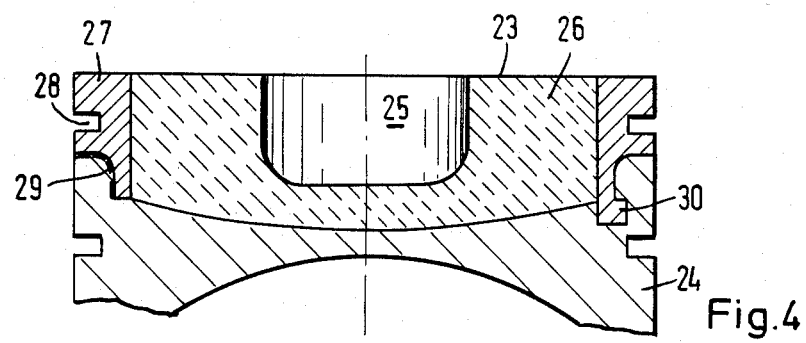
FIG. 4 illustrates a third modified form of a piston with an insert mounted in the head of the piston.

A special embodiment of the invention is shown in FIG. 4. The piston body 24 consists of a light metal casting and is provided with a head 23, which consists of a ceramic inner part 26, which defines the combustion chamber recess 25. The periphery of the inner part 26 is set back from the outside peripheral surface of the piston body 24 and a steel ring 27 is shrunk on the inner part 26. The first ring groove 28 is formed in the steel ring 27. The inner part 26 is joined to the piston body 24 either by an intermetallic bonding layer 29, which is disposed between the piston body 24 and that portion of the steel ring 27 which is set back from the skirt of the piston (left-hand half of FIG. 4), or by a positive joint provided by means of an outer flange 30, which is carried by that portion of the steel ring 27 which is set back from the piston skirt (right-hand half of FIG. 4). This design of the piston will result in a smaller clearance volume and will prevent a deposition of oil carbon on the top land.

We claim:

1. A process of joining an insert of ceramic material having a thermal conductivity below 10 W/mk, a coefficient of expansion below $10 \times 10^{-6}$/K and a modulus of elasticity below $7 \times 10^4$ N/mm² in the combustion chamber recess of a cast light metal piston, comprising shrinking around the insert a ring of metallic material which resists creep and/or relaxation at temperatures up to at least 300° C. and casting said piston body about said ring and insert assemble.

2. A process according to claim 1, wherein said ring comprises ferrous material.

3. A process according to claim 2, wherein said ring comprises austenitic cast iron having a lamellar graphite structure.

4. A process according to claim 1, wherein ceramic material comprises aluminium titanate.

5. A process according to claim 1, wherein said insert and ring are joined to said piston by an intermetallic intermediate layer during casting.

6. A process according to claim 5, wherein said casting comprises an aluminium alloy, said ring comprises a ferrous material and the insert and ring assembly is heated to 700° C. to 750° C. before the prior to said casting insert is embedded.

* * * * *

UNITED STATES PATENT AND TRADEMARK OFFICE
CERTIFICATE OF CORRECTION

PATENT NO. : 4,495,684

DATED : January 29, 1985

INVENTOR(S) : Wilfried Sander, et al

It is certified that error appears in the above-identified patent and that said Letters Patent is hereby corrected as shown below:

| | |
|---|---|
| Col. 2, line 1 and Col. 4, line 39 | Delete "aluminium" and substitute --aluminum-- |
| Col. 2, line 40 | Delete "consists" and substitute --consist-- |
| Col. 2, line 60 | Delete "casting" and substitute --castings-- |
| Col. 4, line 22 | After "N/mm$^2$" insert --,-- |
| Col. 4, line 26 | After "300°C." insert --,-- |
| Col. 4, lines 41, 42 | Delete remainder of sentence after "750°C." and substitute --prior to said casting.-- |

Signed and Sealed this

Twentieth Day of August 1985

[SEAL]

Attest:

DONALD J. QUIGG

Attesting Officer

Acting Commissioner of Patents and Trademarks